United States Patent Office 3,644,572
Patented Feb. 22, 1972

3,644,572
POLYAMIDE-POLYESTER DISPERSIONS CONTAINING SECONDARY AND TERTIARY AMINO TERMINATING MOIETIES ON THE POLYAMIDES
Richard E. Mayer, Richmond, and Lamberto Crescentini, Chester, Va., assignors to Allied Chemical Corporation, New York, N.Y.
No Drawing. Filed Nov. 26, 1968, Ser. No. 779,253
Int. Cl. C08g 41/04
U.S. Cl. 260—857 R
12 Claims

ABSTRACT OF THE DISCLOSURE

A polyamide having a substantial proportion of primary amino end-groups bound to terminating agents containing tertiary or unreactive secondary amino groups can be spun into filaments, when said polymer is melted or melt-blended with polyester, without adverse interaction occurring between the copolymers whereby the resultant product possesses enhanced dyeability characteristics with acid dyes.

BACKGROUND OF THE INVENTION

This invention relates to polyamides, polyester dispersions in polyamides, and to filaments produced therefrom. More particularly, it relates to polyester dispersions in polyamides, commonly called polyblends, wherein polyamide end-groups are terminated for the dual purpose of eliminating polymer interaction and enhancing acid-dyeability of the resultant polyblend.

It is known that filaments of poor quality are usually obtained from dispersions of polyesters of polyamides if the number of primary amino end-groups exceed about 40% of the total end-group concentration in the polyamide. When the primary amino end-groups concentration does exceed about 40%, particulate matter forms in the polyblend as a result of copolymer interactions causing stress weakness in filaments spun therefrom. One method for obviating this problem is discussed in U.S. Pat. 3,369,057 to Twilley, which teaches the use of non-nitrogen bearing mono- and dicarboxylic acids as "terminators" to reduce the concentration of polyamide primary amino end-groups. However, filaments spun from such acid-terminated polyamides or dispersions of polyesters in such polyamides in accordance with Twilley are relatively unreceptive to acid dyes because of the low amino end-group concentration.

Stress weakness in polyamide or polyblend filaments containing relatively high primary amino end-group concentrations is also caused by degradation of the polymeric structure upon exposure to light. Filament yarns and cords made from polyamides and polyblends are extremely useful as a fibrous reinforcement in elastomeric tires, conveyor belts, seat belts, hoses, and the like. However, a high strength material is required. Therefore it is an object of the present invention to provide polyamides and polyblends that resist molecular degradation when exposed to light and exhibit high receptivity toward acid dyes.

It is a further object of the present invention to provide "chain terminated" polyamides suitable for melt-blending with polyesters.

It is another object of the present invention to provide polyamides containing polyester dispersions therein which can be spun into filament without adverse interaction between the copolymers.

These and other objects will become more apparent on reading the following detailed disclosure.

SUMMARY OF THE INVENTION

It has now been found that polyamides can be prepared which are melt-blendable with polyesters without chemically reacting therewith and which have enhanced acid-dyeable characteristics. In one aspect of the instant invention polyamides are produced with the primary amino end-groups of the polyamide and which contain an unreactive but relatively basic moiety.

Polyamides suitable to the practice of this invention can be prepared by heating to reaction temperature a monoaminocarboxylic acid, such as 6-aminocaproic acid, 7-aminoheptanoic acid, 9-aminononanoic acid and 11-aminoundecanoic acid or its corresponding lactam. Alternatively, suitable polyamides can be prepared by heating to reaction temperature substantially equimolar proportions of a diamine and dicarboxylic acid. Hexamethylenediamine, pentamethylenediamine, octamethylenediamine and decamethylenediamine are among the many suitable diamines that can be chosen; whereas, suitable dicarboxylic acids include adipic acid, sebacic acid, suberic acid, and undecanedioic acid.

According to the above aspects of this invention, the concentration of primary amino end-groups is effectively reduced without impairing and in fact enhancing the receptivity of the polyamide toward acid dyes.

More specifically, polyamides which are readily acid-dyeable and which can be blended with polyesters in the molten state and thereafter spun into filaments are produced according to the instant invention by having a substantial proportion of the polyamide end-groups bound to an amino-terminating moiety, i.e., a moiety which terminates the amino end of the polyamide chain, which terminating moiety is chemically inert with respect to the polyester and contains a secondary or tertiary amino group.

DESCRIPTION OF THE PREFERRED EMBODIMENTS

Chain terminators of use in the instant invention for terminating the primary amino end-groups of a polyamide include any compounds which satisfy the following requirements: terminating capacity, i.e., it must react with the amino end of a polymadie chain to block further propagation of the chain; substantial chemical inertness with respect to polyesters, and the presence of a secondary or tertiary amino group. Among the effective terminating moieties are those of the formula

wherein:

R is a divalent organic group containing up to about 20 carbon atoms;

A is selected from the group consisting of hydrogen, aliphatic, alicyclic, aromatic and heterocyclic substituents containing up to about 20 carbon atoms, said heterocyclic substituent containing a heteroatom selected from the group consisting of oxygen, sulfur and tertiary nitrogen;

B is selected from the group consisting of aliphatic, alicyclic, aromatic and heterocyclic substituents containing up to about 20 carbon atoms, said heterocyclic substituent containing a heteroatom selected from the group consisting of oxygen, sulfur, and tertiary nitrogen; and A, B, and N in structure I, taken together, form a nitrogen heterocycle containing up to 2 additional heteroatoms each selected from the group consisting of oxygen, sulfur and tertiary nitrogen.

Preferred amino-terminating moieties are those of Formula I wherein R is alkylene, A is hydrogen or alkyl, B is alkyl or cycloalkyl; or A, B, and N, taken together, form a nitrogen heterocycle containing up to 2 additional heteroatoms selected from the group consisting of oxygen, sulfur or tertiary nitrogen. Specific preferred moieties include the followng:

β-(N,N-dimethylamino)propionyl-
α-(N,N-diethylamino)propionyl-
β-(N-cyclohexylamino)propionyl-
N-pyrrolidylacetyl-
N-morpholinylacetyl-
α-(N-pyrrolidyl)propionyl-
α-(N-piperidyl)acetyl
α-(N-morpholinyl)acetyl
α-(N'-methyl-N-piperazyl)acetyl- Suitable methods for preparing compounds for introduction of preferred amino-terminating moieties are described in:

Journal of the Chemical Society, 1950, 1342–5;
Journal of Pharmacy and Pharmacology, 16 (9) 618–26 (1964);
Journal of the American Chemical Society, 75 3413–17 (1953);
Journal of the American Chemical Society, 83 3323–7 (1961);
Acta Universitatis Szegediensis, Acta Physica et Chemica, 5 No. 1–2, 43–6 (1959);
Journal of Organic Chemistry, 26 779–82 (1961);
Organic Syntheses, Coll. vol. IV, p. 466.

The amino-terminating moieties can be introduced into the polyamide by means of any suitable derivative which will afford the desired moiety. For example, moieties of Formula I can be introduced in the form of aminoacids of Formula II or the corresponding ester of Formula III.

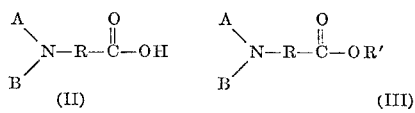

wherein A, B, and R are as aforesaid and R' is alkyl. Use of the lower alkyl esters of Formula III is preferred unless volatilization thereof during the polymerization reaction makes the acid more suitable. Other amide-forming derivatives which might be employed include acid anhydrides, acid halides, etc.

The terminating moieties of the present invention can be incorporated in the polyamdie during the polymerization reaction i.e. by adding the terminator system directly to the reaction medium, or after polymerization is completed, by dry-blending the material with the polyamide before producing the filament. In the event that polyester microfibers are to be dispersed in the polyamide, terminating moieties should be incorporated prior to forming the dispersion so as to avoid interaction with the polyester.

In order to obtain polyamides that do not form gel particles with dispersed polyester, it is necessary that a substantial proportion of the primary amino end-groups be bound to terminating moieties. Specifically, it is desirable that not more than about 40% of end-groups of the polyamide be unbound primary amino groups. Inasmuch as the minimum reduced viscosity of the polyamides employed in the polyamide-polyester dispersions is about 0.9, corresponding to number average molecular weight of about 15,000, these polyesters will have total end-group concentration of about 135 milliequivalents per kilogram of polyamide. Thus, the maximum of about 40% unbound primary amino groups in the instant invention corresponds to about 55 meq./kg. Preferably, the concentration of primary amino groups in the product will be less than about 40 milliequivalents per kilogram of polyamide and more preferably less than about 20 meq./kg. Most preferably, the amino end-group concentration will be less than about 10 meq./kg.

The improvement of the instant invention is most advantageously employed in conjunction with poly ε-capro- amide and polyester dispersions therein where the polyester has recurring ester linkages and recurring cyclic structure in the main polyester chain, for example, polyethylene terephthalate. Other suitable polyesters include polyethylene 2,6 naphthalene dicarboxylate, polyethylene 2,7 naphthalene dicarboxylate, polyethylene isophthalate and polyethylene 5-t-butylisophthalate. The polyamide is produced by general procedures well known in the art, for example, by the procedure of charging a reactor vessel with caprolactam, thereafter heating to form a melt and subsequently admixing aminocaproic acid with the melt. The amino-terminating moiety is introduced either during or after the polymerization. The polyester dispersion and filaments made therefrom are also produced according to general procedures well known in the art. For example, aforesaid U.S. Pat. 3,369,057 discloses in great detail a method for producing the polyamide-polyester dispersions and filaments made therefrom. Various ingredients may be incorporated into the polymer components either prior to or during the blending operation, said ingredients including: stabilizing agents such as copper compounds and hindered phenols which protect the polymer against adverse effects of heat, aging, oxidation, and ultraviolet light; reinforcing particles such as silica, and carbon black; adhesion-promoting agents; fluorescent materials; delustering agents such as titanium dioxide and dispersing agents to facilitate and maintain dispersion of the polyester particles.

Filaments produced from the instant terminated poly-ε-caproamide-polyethylene terephthalate dispersions according to methods taught by aforesaid U.S. Pat. 3,369,057 exhibited excellent receptivity to acid dyes such as Orange III, Alizarin Milling Blue R, and the like, thereby achieving greater usefulness than polyamide-polyester dispersions available heretofore.

The following examples are provided to more fully illustrate the instant invention. They are provided for illustrative purposes only and are not to be construed as limiting the invention, which is defined by the appended claims.

Example I

A mixture of 1520 g. of ε-caprolactam, 80 g. of ε-aminocaproic acid and 15 g. of ethyl α-(N-pyrrolidyl)propionate was polymerized for 16 hours at 260° C. The resulting polyamide was then extruded, pelletized, washed with hot water and dried. The relative viscosity of a 10% formic acid solution of this polyamide was 44; carboxyl end-group analysis: 55 meq./kg.; amino end-group analysis: 55 meq./kg.

This polyamide was blended with pellets of polyethylene terephthalate having a reduced o-chlorophenol viscosity (0.5% solution) of 0.73, to produce a viscosity stable 70/30 blend which was then spun as a multifilament. A control poly-blend multifilament was similarly prepared wherein the polyamide was terminated with sebacic acid, rather than with ethyl α-(N-pyrrolidyl)propionate, and had a formic acid viscosity of 55. Samples of the two fibers were dyed together in a bath buffered at pH 7.2 containing 0.5% by weight (based on the fibers) of Sulfonine Acid Blue R (Color Index Acid Blue 92). Dispersing agent Triton X-100 (Rohm & Haas) was added in the amount of 1% based on fiber weight. Over a period of 45 minutes, the temperature of the bath was raised from 100° F. to 205° F. where it was maintained for an additional hour. The fiber derived from the pyrrolidyl-terminated polyamide showed a very deep blue color (about 3 on the Munsell neutral gray scale) while the control appeared almost white (about 8 on the Munsell neutral gray scale).

Example II

The procedure of Example I was repeated wherein the following terminators were substituted for said ethyl α-(N-pyrrolidyl)propionate. The fibers were dyed with Alizarin Milling Blue R and exhibited the indicated dye performance on a scale of 1–5 (1: very deep color; 5: very light color). Control fibers produced from polyamides terminated with acetic acid and sebacic acid each showed dye performance of 5 on the same scale.

| Terminator | Amount, g. | FA viscosity | Carboxyl end-group analysis, meq./kg. | Amino end-group analysis, meq./kg. | Dye performance |
|---|---|---|---|---|---|
| Ethyl N-pyrrolidylacetate | 19.5 | 69.1 | 46.3 | 42.3 | 2 |
| Ethyl N-piperidylacetate | 10.3 | 58.2 | 48.0 | 44.0 | 2 |
| β-(N-cyclohexylamino)propionic acid | 12.5 | 29.6 | 45.2 | 30.0 | 1 |

Since different embodiments of this invention may be made without departing from the spirit and scope thereof, it is to be understood that we do not limit ourselves to the specific embodiments thereof except as defined in the appended claims.

We claim:

1. In a polyamide filament having repeating carbonamide groups as an integral part of the linear polymeric chain, said polyamide having dispersed therein about 10–50% based on the total weight of the polyamide and polyester by weight of polyester microfibers, said polyester being prepared from an aromatic dicarboxylic acid and an aliphatic glycol, the improvement wherein not more than about 40% of the primary amino end-groups of said polyamide are unbound primary amino end-groups, and at least about 60% of the primary amino end-groups of said polyamide are bound to an amino-terminating moiety, having a substituent of the formula

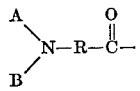

bound to terminal amino groups wherein
- R is a divalent organic group containing up to about 20 carbon atoms;
- A is selected from the group consisting of hydrogen, aliphatic, alicyclic, aromatic and heterocyclic substituents containing up to about 20 carbon atoms, said heterocyclic substituent containing a heteroatom selected from the group consisting of oxygen, sulfur and tertiary nitrogen;
- B is selected from the group consisting of aliphatic, alicyclic, aromatic and heterocyclic substituents containing up to about 20 carbon atoms, said heterocyclic substituent containing up to about 20 carbon atoms, said heterocyclic substituent containing a heteroatom selected from the group consisting of oxygen, sulfur and tertiary nitrogen; and
- A, B and N taken together, form a nitrogen heterocycle containing up to 2 additional heteroatoms each selected from the group consisting of oxygen, sulfur and tertiary nitrogen;

which terminating moiety is inert to said polyester whereby (1) acid-dyeability of the filament is enhanced and (2) interaction between the polyamide and the polyester is eliminated.

2. The improvement of claim 1 wherein said polyamide is poly-ε-caproamide and said polyester is polyethylene terephtalate.

3. The improvement of claim 1 wherein said amino terminating moisty is of the formula

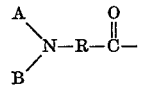

wherein R is alkylene and A and B are each alkyl containing up to about 20 carbon atoms.

4. The improvement of claim 1 wherein said amino-terminating moiety is of the formula

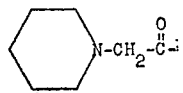

5. The improvement of claim 1 wherein said amino-terminating moiety is of the formula

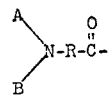

wherein R is as aforesaid, and A, B and N, taken together, form a nitrogen heterocycle containing up to 2 additional heteroatoms each selected from the group consisting of oxygen, sulfur and tertiary nitrogen.

6. The improvement of claim 5 wherein said amino-terminating moiety is of the formula

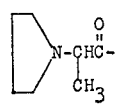

7. The improvement of claim 1 wherein said amino-terminating moiety is of the formula

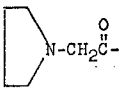

8. The improvement of claim 5 wherein said amino-terminating moiety is of the formula

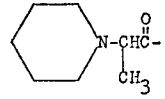

9. The improvement of claim 1 wherein said amino-terminating moiety is of the formula

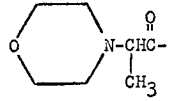

10. The improvement of claim 5 wherein said amino-terminating moiety is of the formula

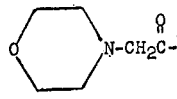

11. The improvement of claim 1 wherein said amino-terminating moiety is of the formula

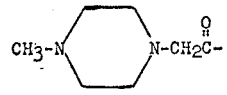

12. A method of producing a polyamide having repeating carbonamide groups as an integral part of the linear polymeric chain, said polyamide containing a polyethylene terephthalate dispersion therein which has enhanced acid-dyeable characteristics comprising the step of combining poly-ε-caproamide and polyethylene terephthalate, said poly-ε-caproamide having a substituent of the formula

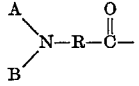

bound to terminal amino groups wherein
R is a divalent organic group containing up to about 20 carbon atoms;

A is selected from the group consisting of hydrogen, aliphatic, alicyclic, aromatic and heterocyclic substituents containing up to about 20 carbon atoms, said heterocyclic substituent containing a heteroatom selected from the group consisting of oxygen, sulfur and tertiary nitrogen;

B is selected from the group consisting of aliphatic, alicyclic, aromatic and heterocyclic substituents containing up to about 20 carbon atoms, said heterocyclic substituent containing up to about 20 carbon atoms, said heterocyclic substituent containing a heteroatom selected from the group consisting of oxygen, sulfur and tertiary nitrogen; and A, B and N taken together, form a nitrogen heterocycle containing up to 2 additional heteroatoms each selected from the group consisting of oxygen, sulfur and tertiary nitrogen; the proportions of said polyamide and said polyester being about 70 parts by weight of polyamide and about 30 parts by weight of polyester per 100 parts by weight of polyester per 100 parts by weight of the total polyamide and polyester, and said polyamide containing not more than about 40% of primary amino end-groups, i.e. at least about 60% of the primary amino end groups of said polyamide are bound to said amino-terminating substituent, whereby (1) acid-dyeability of the polyamide-polyethylene terephthalate dispersion is enhanced and (2) interaction between the polyamide and the polyethylene terephthalate is eliminated.

References Cited
UNITED STATES PATENTS 2,174,527  10/1939  Peterson _____ 260—78
3,369,057  2/1960  Twilley _____ 260—857

PAUL LIEBERMAN, Primary Examiner

U.S. Cl. X.R.

260—40 P, 75 R, 78 R, 78 A, 78 SC

FO-1050
(5/69)

UNITED STATES PATENT OFFICE
CERTIFICATE OF CORRECTION

Patent No. 3,644,572  Dated February 22, 1972

Inventor(s) Richard E. Mayer et al.

It is certified that error appears in the above-identified patent and that said Letters Patent are hereby corrected as shown below:

Column 1, line 34, after "polyesters", delete "of" and insert --in--.

Column 2, line 6, after "produced", insert --by employing polyamide chain terminators which react exclusively--.

Column 2, line 43, "polymadie" should be --polyamide--.

Column 3, line 47, "polyamdie" should be --polyamide--.

Column 5, line 63, claim 3, "moisty" should be --moiety--.

Signed and sealed this 4th day of July 1972.

(SEAL)
Attest:

EDWARD M. FLETCHER, JR.
Attesting Officer

ROBERT GOTTSCHALK
Commissioner of Patents